US011862828B2

(12) United States Patent
Ceres (10) Patent No.: US 11,862,828 B2
(45) Date of Patent: Jan. 2, 2024

(54) POWER MANAGEMENT OF ELECTROLYTIC CELLS

(71) Applicant: Aquamox Inc., Chicago, IL (US)

(72) Inventor: Donato M. Ceres, Chicago, IL (US)

(73) Assignee: Aquamox Inc., Chicago, IL (US)

( * ) Notice: Subject to any disclaimer, the term of this patent is extended or adjusted under 35 U.S.C. 154(b) by 186 days.

(21) Appl. No.: 17/392,049

(22) Filed: Aug. 2, 2021

(65) Prior Publication Data

US 2023/0029737 A1 Feb. 2, 2023

(51) Int. Cl.
| | |
|---|---|
| H01M 8/04858 | (2016.01) |
| H05B 45/10 | (2020.01) |
| H01M 4/96 | (2006.01) |
| H01M 8/0444 | (2016.01) |
| H01M 8/0432 | (2016.01) |
| C25B 9/23 | (2021.01) |
| C25B 11/043 | (2021.01) |
| C25B 15/02 | (2021.01) |
| C25B 15/023 | (2021.01) |
| C25B 15/027 | (2021.01) |
| C02F 1/461 | (2023.01) |
| H01M 4/04 | (2006.01) |

(52) U.S. Cl.
CPC ..... *H01M 8/04925* (2013.01); *C02F 1/46104* (2013.01); *C25B 9/23* (2021.01); *C25B 11/043* (2021.01); *C25B 15/02* (2013.01); *C25B 15/023* (2021.01); *C25B 15/027* (2021.01); *H01M 4/0438* (2013.01); *H01M 4/96* (2013.01); *H01M 8/0432* (2013.01); *H01M 8/04477* (2013.01); *H01M 8/04895* (2013.01); *H05B 45/10* (2020.01)

(58) Field of Classification Search
CPC ................................ C25B 9/23; C25B 9/65
See application file for complete search history.

(56) References Cited

U.S. PATENT DOCUMENTS

| | | | | |
|---|---|---|---|---|
| 5,148,772 | A * | 9/1992 | Kirschbaum | A01K 63/04 |
| | | | | 210/243 |
| 2009/0211918 | A1 * | 8/2009 | Hardee | C25B 15/00 |
| | | | | 205/628 |
| 2013/0206654 | A1 * | 8/2013 | Lutz | C02F 1/4672 |
| | | | | 210/85 |

(Continued)

*Primary Examiner* — Brian W Cohen
(74) *Attorney, Agent, or Firm* — Paul E Schaafsma; NovusIP, LLC (57) ABSTRACT

In accordance with the principles of the present invention, a system and method for the management of the power applied to electrolytic cell is provided. The power management consists a constant current regulation, H-bridge control by pulse width modulation (PWM), and dimming control of the applied current to the electrolytic cell. The constant current regulation is an analog control that maintains the applied current at a user-defined current setpoint. The time scale of constant current regulation ranges from tenth of microseconds to milliseconds. The PWM control of the H-bridge allows for the instant adjustment of the electrolytic production output by turning the cell on and off; the time scale of the PWM control ranges from tenths of milliseconds to seconds. The dimming control allows the change of the applied constant current; the time scale of the dimming control ranges from milliseconds to hours and longer.

15 Claims, 6 Drawing Sheets

(56) References Cited

U.S. PATENT DOCUMENTS

2014/0158525 A1* 6/2014 Greene ............... C02F 1/46104
　　　　　　　　　　　　　　　　　　　　　318/400.29
2017/0137953 A1* 5/2017 Jonte ......................... C25B 9/19
2021/0024383 A1* 1/2021 Lust ..................... C02F 1/4672

* cited by examiner

Time: 1ms / div

*FIG. 5*

Time: 100ms / div

POWER MANAGEMENT OF ELECTROLYTIC CELLS

FIELD OF THE INVENTION

The present invention relates in general to power control in electrolytic cells and, more particularly, to power management of electrolytic ozone generators.

BACKGROUND OF THE INVENTION AND STATE OF THE ART

An electrolytic cell is a device that enables electrochemical reactions when electrical power is applied. Electrolytic cells comprise two electrodes connected to the opposite poles of a power supply: an anode to the positive voltage and a cathode to the negative voltage. The passage of current through fluid between the anode and cathode can produce a series of redox (reduction-oxidation) reactions that can also include the electrolysis of the molecules of the fluid, which could consist of organic and inorganic molecules as well as solvents and water.

Electrical current between the anode and cathode results from the reduction and oxidation of the molecules present in the fluid. The number of electrons passed is strictly related to the specific electrochemical reactions and the type of molecules present in the fluid. For instance, ozone generation by the electrolysis of water at the anode is described as follows by Equation 1:

$$3H_2O \rightarrow O_3 + 6H^+ + 6e^- \quad E^0 = 1.51V \qquad \text{Eq.1}$$

The charge (Coulomb) passage associated with six electrons per unit time necessary for the generation of one mole of ozone represents the minimal electrical current required by the external power supply.

Equation 1 also describes the rate of consumption of the water molecules that results in ozone formation. This process leads to the dehydration of the medium between the anode and cathode, and for ozone production to continue, more water needs to reach the anode. Thus, the diffusion process of the water to reach the anode could be defacto a rate-limiting step for ozone production.

A typical electrolytic cell for ozone generation could include a proton exchange membrane (PEM) to enhance the yield of ozone production by preventing the recombination of ozone with the co-generated protons, as described in Equation 1. Protons are sequestered from the anode by the membrane and transferred to the cathode, where the protons evolve into hydrogen gas, as defined by Equation 2:

$$2H^+ + 2e^- \rightarrow H_2 \quad E = 0V \qquad \text{Eq.2}$$

When an electrolytic cell comprises a membrane, the ionic current in such a membrane can have detrimental effects on its integrity. Excessively high current can cause the membrane to degrade due to overheat and dehydrate due to water evaporation.

Combining these two phenomena can induce permanent deformation of the membrane and reduce the ability of the membrane to transfer protons and adsorb water. Consequently, the proton transfer yield may drop and reduce ozone production.

Typical electrolytic cells for ozone generation may include boron-doped diamond (BDD) electrodes because BDD electrodes have higher voltages for hydrolysis than common electrodes, resulting in a more efficient ozone generation. BDD electrodes can resist high-current densities; however, BDD electrodes can also lose diamond material over time by delamination and electropolishing. These processes are highly current-dependent. Excessively high current can accelerate the degradation of these electrodes, significantly reducing the lifetime of BDD electrodes.

From an electrical point of view, an electrolytic cell is a variable load with variable current-voltage characteristics. A variety of phenomena can cause the variability of the electrical load of the electrolytic cell. These phenomena can include electron transfer to redox species, water electrolysis, ionic transfer through the fluid between the electrodes (including the membrane), hydration and dehydration processes, mass transport, and electrode degradation. Other phenomena could include heat generation and dissipation, cavitation, variable water flowrate, variable conductivity of the fluid, etc. In addition, secondary electrical redox reactions with contaminant molecules can result in parasitic electrical currents that may change the electrical load of the cell unpredictably.

Fluctuations of the electrical load due to these phenomena can occur on a wide range of time scales. Therefore, it is reasonable to assume that if the current applied to an electrolytic cell is kept constant, the electrolytic products will be constant. However, the total current is divided into several electrical pathways that change with different time constants. Therefore, to maintain the electrolytic products constant, the applied constant current should vary to adapt to the load changes.

These phenomena can limit the electrolytic product yield and reduce the lifetime of the cell. Therefore, it would be beneficial to establish power management controls capable of maintaining a constant and tunable electrolytic production and compensating for time-dependent phenomena, which may occur on various time scales, from microseconds, to seconds, to hours, and more. Such power management would have the desired benefit to provide a more stable product output and extend the lifetime of the electrolytic cell.

SUMMARY OF THE INVENTION

This Summary of the Invention is provided to introduce a selection of concepts in a simplified form that is further described below in the Detailed Description section. This Summary of the Invention is not intended to identify key features or essential features of the claimed subject matter, nor is it intended to be used as an aid in determining the scope or spirit of the claimed subject matter.

The system and method for power management in accordance with the principles of the present invention present a practical and comprehensive way to manage the power of an electrolytic device with the benefits of better controlling the output of the electrolytic products as well as extending the lifetime of the electrolytic device.

In accordance with the principles of the present invention, a system and method for power management of an electrolytic device are provided. The system can include a source of alternating current (AC), an alternating current to direct current (AC/DC) converter, a constant current regulator, an H-bridge, a sensor, an electrolytic cell, and a microcontroller. Relevant sensors can include, but not limited to, a flow meter, a current sensor, a voltage sensor, an ozone sensor, temperature sensors, and the like.

The power is provided by the AC power source and is converted to a DC current by the AC/DC converter. The DC current is maintained constant at a user-defined current setpoint value by the constant current regulator. The regulated DC current drives the electrolytic cell via the H-bridge.

The H-bridge also controls the polarization of the electrolytic cell, which is reversed at periodic intervals of time defined by the user. A process in the microcontroller analyzes the output of sensors that measure the relevant parameters. These parameters may include the regulated constant current, the DC voltage, water flowrate, electrolytic cell product output, water temperature, and H-bridge temperature. The microcontroller utilizes sensor data to manage the power of the cell that may include the dimming of the regulated current setpoint and the pulse width modulation (PWM) of the regulated current duty cycle that drives the electrolytic cell at the H-bridge.

The power management method can comprise constant current regulation, H-bridge control by PWM, and dimming control of the applied current to the electrolytic cell. The constant current regulation is an analog control that maintains the applied current at a user-defined current setpoint; the time scale of constant current regulation ranges from tenth of microseconds to milliseconds. The PWM control of the H-bridge allows for the instant adjustment of the electrolytic production output by turning the cell on and off, the time scale of the PWM control ranges from tenths of milliseconds to seconds. The dimming control allows the change of the applied constant current; the time scale of the dimming control ranges from milliseconds to hours and longer.

BRIEF DESCRIPTION OF THE DRAWINGS

The accompanying Drawings illustrate several embodiments and, together with the description, serve to explain the principles of the present invention according to the example embodiments. It will be appreciated by one skilled in the art that the particular arrangements illustrated in and described with respect to the Drawings are merely exemplary and are not to be considered as limiting of the scope or spirit of the present invention or the claims herein in any way.

As noted above, in the above reference Drawings, the present invention is illustrated by way of example, not limitation, and modifications may be made to the elements illustrated therein, as would be apparent to a person of ordinary skill in the art, without departing from the scope or spirit of the invention.

DETAILED DESCRIPTION OF EMBODIMENTS

Introduction

Electrolytic cells are devices that generate products from electrochemical reactions that occur at the surface of the electrodes. These reactions are driven by the current and voltage applied to the cell, which exhibits an electrical load that varies over time depending on a wide variety of electrochemical pathways and other physical and chemical principles. The generation of electrolytic products and the lifetime of the cell are closely related to the current and voltage applied. It is therefore desirable to control these parameters. Since these current-driven reactions are not constant and occur at time scales that vary from microseconds to seconds to hours, proper power management of an electrolytic cell should be performed over those time scales.

Fast phenomena that affect the electrical cell load can include, for instance, the electron transfer process to redox species in the fluid at the electrode surface (electrolysis). Applying a current that stays constant over these relatively fast time scales (sub-microseconds to microseconds) can maintain a constant electrolytic production at a first approximation. This current control can be achieved using analog controls as analog constant current regulators. Light emitting diode (LED) drivers can be utilized as power supplies for these applications. Many LED drivers enable adjustment of the current output at a user-defined constant current setpoint via a dimming input to provide an efficient and convenient way to maintain a constant current with variable loads. Alternatively, in the absence of an LED driver, it is possible to use analog regulators to provide a constant current, such as those comprising metal-oxide-semiconductor field-effect (MOSFET) transistors that can be configured to output a constant current.

Another phenomenon that occurs at a fast time scale is polarity reversal for removing limescale from the electrodes. Polarity reversal is applicable in ozone-producing electrolytic cells comprising an anode and a cathode made of the same material and compatible with cathodic currents, such as boron-doped diamond (BDD) electrodes. Moreover, zero-gap electrolytic cells comprising proton exchange membrane (PEM) generally behaves as resistive loads. The current polarity reversal takes place typically instantaneously, with the voltage polarity reversal within a few microseconds. Therefore, it is important to managing the power to an electrolytic cell that can maintain the applied current as constant as possible even when these fast changes occur.

Variable flow rates (from hundreds of milliseconds and up) and aging of the cell (typically in the thousands of operating hours) occur on a much longer time scale. Cell aging can be asserted from the loss of the electrolytic product yield over time as monitored by a sensor at the output of the cell. Cell aging is also accompanied by an increase in the electrical load, meaning that the applied voltage of the cell will also increase. Based on this, it was found that the applied constant current should be increased over the lifetime to compensate for the loss of the electrolytic production yield. Typically, when the cell ages, yield loss occurs because additional parasitic electron transfer pathways become more prominent while that producing the electrolytic product is reduced. Applied constant current can be adjusted via a dimming signal to the analog constant current regulator to change the current setpoint.

Variable fluid flow rate entering the cell, which could typically occur in the hundreds of milliseconds and longer time scale, can cause changes in hydration and dehydration rates and the level of redox contaminants, which can alter the production of the electrolytic product transiently. Therefore, the applied current should be adjusted dynamically to compensate for such changes and maintain a constant electrolytic product yield. For instance, if the water flow rate decreases in an ozone-producing electrolytic cell, the applied current should be deceased to prevent membrane dehydration, overheating, permanent damage, and loss of constant ozone production. Control of the current setpoint can compensate for these phenomena, which could occur on time scales of hundreds of milliseconds to minutes, to hours, and longer. The constant current control over long-timescale phenomena can be achieved via a dimming of the current setpoint of the constant current regulator.

Another control can be achieved by pulse width modulation (PWM) of the duty cycle of the applied current at the H-bridge—an H-bridge that is typically used for controlling brushed motor speed and direction. Similarly, an H-bridge can control the applied voltage and the polarity reversal of the electrolytic cell; however, the sole application of PWM to the H-bridge cannot be used to manage the ozone output of zero-gap electrolytic cells for ozone generation. PWM should be paired with a dimming of the current setpoint. This is because electrolytic cells do not behave as capacitive loads like a brushed motor but rather as resistive loads. Consequently, PWM of the duty cycle at the H-bridge would not reduce the applied current to the cell. As a result, the full constant current can be applied at each ON pulse at the typical PWM frequency (typically from 200 Hz to 2 MHz).

In the case of variable flow rates, PWM modulation of the duty cycle at the H-bridge alone cannot be used to dim the applied current. Variable flow rates require dimming of the applied constant current at the constant current regulator, as explained above. Since the full current is applied at each ON pulse, the electrolytic cell could experience an excess of current even if the flow rate is low, resulting in excessive dehydration of the membrane, overheating, accelerated aging, and irreversible cell damage.

PWM of the duty cycle at the H-bridge does not alter the electrochemical rate of ozone production at the electrode because the current applied is the same; however, PWM of the duty cycle at the H-bridge intermittently stops production during the OFF cycles. During the ON cycles, the process occurs at a rate dictated by the applied constant current, which is adequately dimmed based on chemical and physical requirements, such as flowrate; however, PWM can modulate the ozone production without altering the electrolytic processes, which are determined primarily by the level of hydration (flow rate) and aging of the cell (parasitic currents). Therefore, in combination with the dimming of the applied constant current at the constant current regulator, PWM is beneficial for an additional, temporary, and faster adjustment of the ozone output over intermediate time scales, such as hundreds of milliseconds to seconds, to hours.

A power management system in accordance with the principles of the present invention can include a source of AC, an AC/DC converter, a constant current regulator, an H-bridge, a sensor, an electrolytic cell, and a microcontroller. Relevant sensors can include, but not limited to, a flow meter, a current sensor, a voltage sensor, an ozone sensor, temperature sensors, and the like. First, the AC source is converted to a DC current by the AC/DC converter. Next, the DC current enters the constant current regulator that maintains the current constant at a constant current setpoint. The microcontroller controls the constant current setpoint based on sensor input. The constant current enters the H-bridge, which drives the electrolytic cell.

The constant current regulator typically includes an analog device that adjusts the output current to maintain the current at a user-defined constant current setpoint. Load regulation, i.e. the accuracy to maintain the current stable, is typical to be less than about +/−2.5%, usually less than about +/−1%, but likely less than about +/−0.5%.

As previously described, LED drivers are convenient power supplies for these applications. In addition, many LED drivers enable adjustment of the current output at a user-defined constant current setpoint via a dimming input. In the absence of an LED driver, it is possible to use analog adjustable regulators that can be configured to output a constant current. In this case, the DC current is regulated to the desired current setpoint with a separate current regulator that might include an analog current regulator.

The H-bridge can drive the electrolytic cell. Water flows through the electrolytic cell while the constant current is applied, producing electrolytic products. In a preferred embodiment, water flows inside an ozone-generating electrolytic cell comprised of BDD anode and cathode at either side of a PEM. The applied current results also in the production of ozone. The direction change of the H-bridge corresponds to the polarity reversal of applied current, which is helpful in the removal of limescale such as when hard regular tap water is used to produce ozone. The H-bridge direction enables the polarity reversal of the cell and may be controlled by the microcontroller. The polarization reversal, although recommended for electrolytic ozone generators, is not mandatory. The application of polarization reversal is facultative and does not limit the current invention.

Water consumption and gas evolution by electrolysis at the electrode surface is a significant limitation for electrolytic generators (Equations 1 and 2). Therefore, it is reasonable to assume that a constant current to be directly proportional, at least in a first-order approximation, to the ability to refurbish water to the electrode surfaces, i.e. to the flow rate. Via a proper process, the microcontroller can adjust the constant current regulator via a dimming of the applied current proportionally to the flow rate. In practice, the constant current dimming by the microcontroller should not be directly proportional to the flow rate. This is because an analytical relationship between the constant current dimming and the flow rate can be very complex; however, this can be established by recording the electrolytic products with a suitable sensor and the flow rate.

Without any limitation to the current invention, a particular embodiment can include voltage and current sensors. Typically, voltage and current sensors are placed between the constant current regulator and the H-bridge. These sensors can also be placed after the H-bridge and may not require any particular order. If polarization reversal is applied, when the voltage and current sensors are placed after the H-bridge, current and voltage sign changes would need to be accounted for. Current sensing can be utilized to ensure that the constant current regulator works appropriately. In addition, the relationship between the electrolytic product concentration and the current dimming can also be obtained empirically as a function of the flow rate.

Measurement of the voltage enables estimation of the electrolytic cell lifetime. For example, it is typical in electrolytic cells for ozone generation that the applied voltage for a given constant current increases over time as the cell ages. The electrical resistance increase of the cell is typically associated with membrane degradation, loss of sulfonate groups, and mineral crystallization (limescale). In this case, despite the current being kept constant, the degradation process also could reduce the production yield of electrolytic products, such as ozone. Therefore, it is desired to adjust the dimming of the current to compensate for the reduction of ozone production during the lifetime of the cell, which can be in the order of thousands of hours.

Monitoring the flow rate allows maintaining electrolytic production constant at the desired level. As explained above, the hydration/dehydration process occurring at the electrode can be compensated with changes in the applied current. Therefore, monitoring the flow rate with a flow sensor is the primary sensing to control the electrolytic process. Other parameters might be desirable to control the electrolytic process. These may be but are not limited to the fluid temperature, conductivity, presence of oxidizable organics, and so on.

Many electrolytic products are typically oxidants, which have an intrinsic lifetime: the higher the oxidation potential, the shorter the lifetime. Temperature plays an important role in the decomposition of oxidants: the higher the temperature, the shorter the lifetime. In some cases, it is, therefore, desirable to measure the temperature of the incoming fluid to estimate the expected lifetime of the oxidants. For example, suppose the desired concentration of the electrolytic products is expected at a specific time after production. In that case, the production rate, i.e. the applied current, might be increased proportionally to the temperature to generate more oxidants at the cell and compensate for the higher decomposition rate.

Many electrolytic products are typically oxidants, which have an intrinsic lifetime: the higher the oxidation potential, the shorter the lifetime. Temperature plays an important role in the decomposition of oxidants: the higher the temperature, the shorter the lifetime. In some cases, it is, therefore, desirable to measure the temperature of the incoming fluid to estimate the expected lifetime of the oxidants. For example, suppose the desired concentration of the electrolytic products is expected at a specific time after production. In that case, the production rate, i.e. the PWM, might be increased proportionally to the temperature to generate more oxidants at the cell and compensate for the higher decomposition rate.

Mechanisms have been described that can cause the electrolytic product concentration to vary over time. Variations of physical and chemical processes can be compensated for by changing the applied constant current. It has been discovered that the improved control of the applied current can provide adjustments over the timescales of the different phenomena occurring during the electrolytic process. This power management also ensures efficient production and preservation of the lifetime of the electrolytic cell.

Initial Considerations

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, electrical and other changes may be made without departing from the scope or spirit of the present invention. Particular features of one or more of the embodiments described herein may be described with reference to one or more particular embodiments or figures that form a part of the present invention, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the present invention in any way.

Components and parts that are connected to or in communication with each other need not be in continuous connection or communication with each other, unless expressly specified otherwise. In addition, components and parts that are connected to or in communication with each other may communicate directly or indirectly through one or more connection or communication means or intermediaries, logical or physical.

A description of an aspect with several components in connection or communication with each other does not imply that all such components are required. To the contrary, a variety of optional components may be described to illustrate a wide variety of possible embodiments and in order to more fully illustrate one or more embodiments. Similarly, although process steps, method steps or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single component or article is described herein, it will be readily apparent that more than one component or article may be used in place of a single component or article. Similarly, where more than one component or article is described herein, it will be readily apparent that a single device or article may be used in place of the more than one component or article.

The functionality or the features of a component may be alternatively embodied by one or more other components that are not explicitly described as having such functionality or features. Thus, other embodiments need not include the component itself.

Techniques and mechanisms described or referenced herein will sometimes be described in singular form for clarity; however, it should be appreciated that particular embodiments may include multiple iterations of a technique or multiple instantiations of a mechanism unless noted otherwise. Alternate implementations are included within the scope or spirit of various embodiments in which, for example, functions may be executed out of order from that shown or discussed, including substantially concurrently or in reverse order, depending on the functionality involved, as would be understood by those having ordinary skill in the art.

Conceptual Architecture

Figure 1:
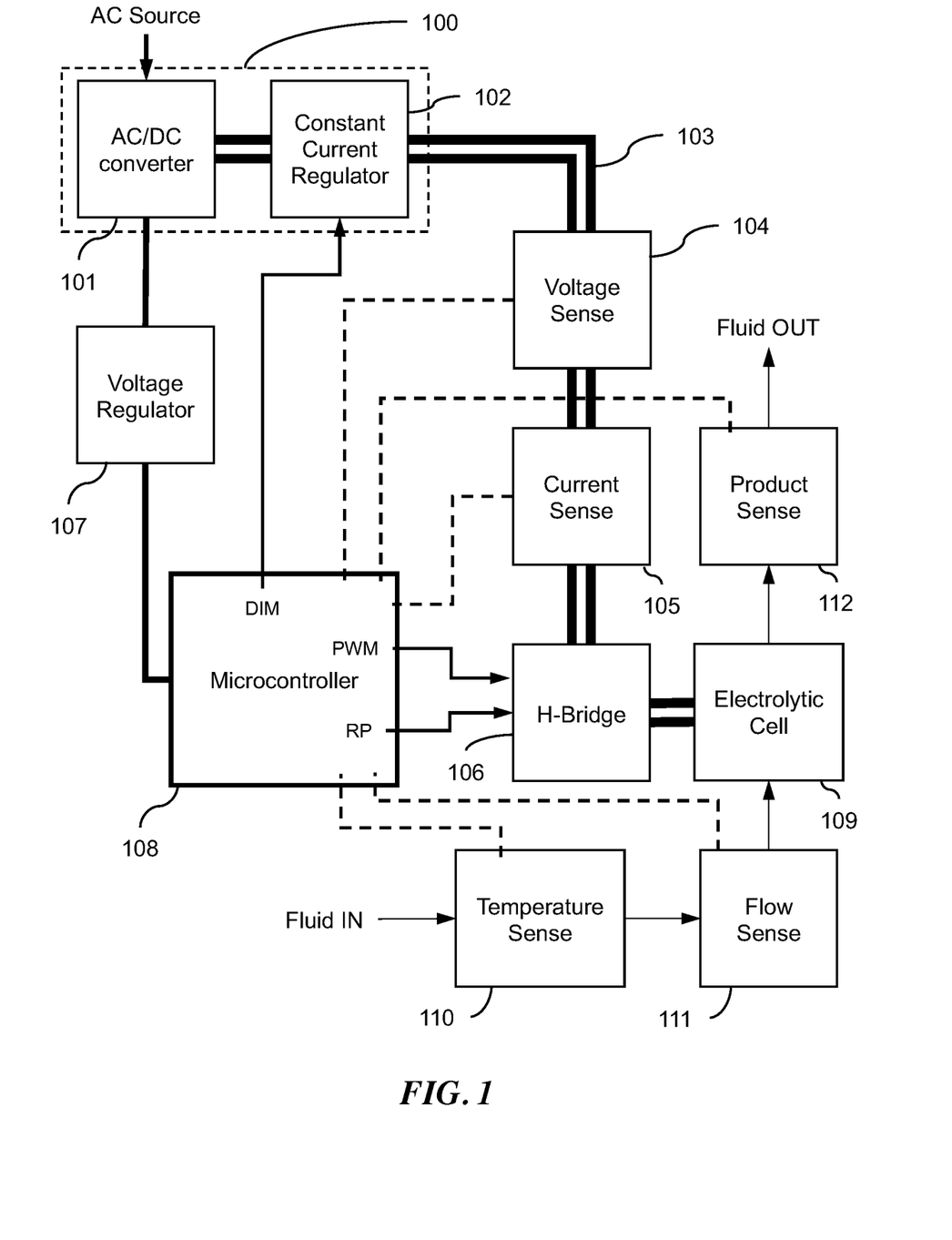
FIG. 1 is a block diagram of an embodiment of a power management system in accordance with the principles of the present invention.

A typical, but not limiting, configuration of electronics for power management of an electrolytic cell in accordance with the principals of the present invention is outlined in the block diagram of FIG. 1. An AC/DC converter 101 is connected to an AC power source. The converted DC voltage enters a constant current regulator 102, maintaining the output 103 at a constant current. The constant current output 103 is determined by the constant current setpoint controlled by the dimming output of a microcontroller 108. The DC output of the AC/DC converter 101 can also be used to feed a constant voltage regulator 107 typically used to power the microcontroller 108. Typically, the AC/DC converter 101 and constant current regulator 102 can be included in an enclosed constant current power supply 100, like the ENEDO RCL050 dual dimming LED driver available from Enedo Inc., Martinkyläntie 43, 01720 Vantaa, Finland, which enables adjustment of the current output at a user-defined constant current setpoint via a dimming input to provide an efficient and convenient way to maintain a constant current with variable loads.

A voltage sensor 104 and a current sensor 105 can be placed along output line 103 to monitor the voltage and current. The values of voltage and current are used by the microcontroller 108, as described in the present invention.

An H-bridge 106 drives an electrolytic cell 109. The polarity of output line 103 is constant, but is reversed by the H-bridge 106 depending on the reverse polarity signal from the microcontroller 108. Polarity reversal changes the anode of the electrolytic cell 109 into the cathode and vice versa. The H-bridge 106 can also turn on and off the power applied to the electrolytic cell 109 with a frequency and duty cycle provided by the H-bridge 106 via pulse width modulation (PWM). Fluid temperature and flow rate are measured by thermometer 110 and flow sensor 111, respectively. Electrolytic product concentration is preferably measured downstream from the electrolytic cell with a sensor 112 specific to the type of product.

Figure 2:
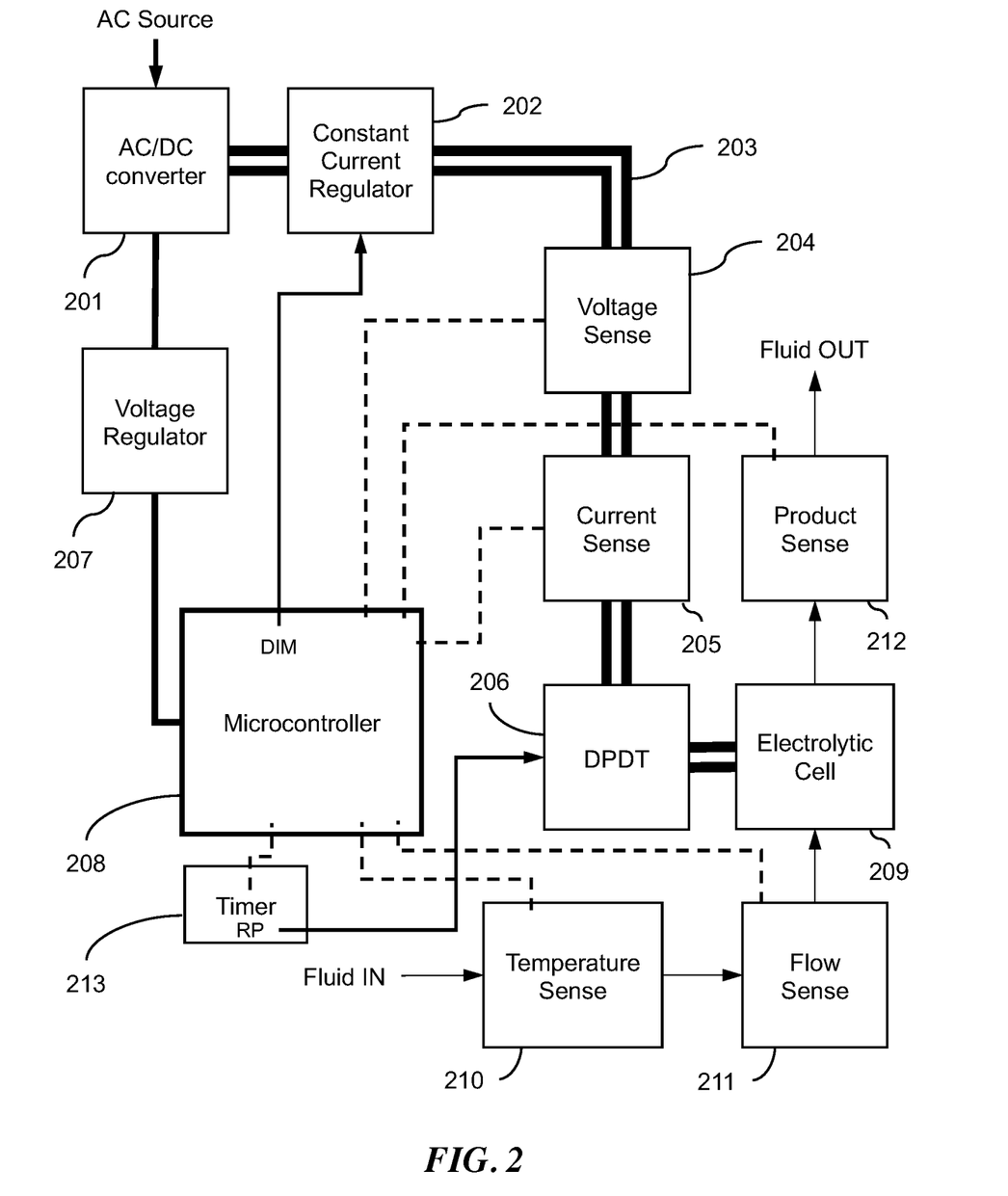
FIG. 2 is a block diagram of another embodiment of a power management system in accordance with the principles of the present invention.

FIG. 2 illustrates a block diagram of an alternative, but not limiting, configuration of electronics for power management of an electrolytic cell in accordance with the principals of the present invention. In this example, AC/DC converter 201 and constant current regulator 202 are not included in a single power supply; constant current regulator 202 can comprise a regulator comprising a metal-oxide-semiconductor field-effect (MOSFET) transistor such as the standard LM317-based adjustable power supply circuit that can be configured to output a constant current. Constant current 203 is determined by the constant current setpoint controlled by the dimming output of the microcontroller 208. The DC output 203 of the AC/DC converter 201 can also be used to feed a constant voltage regulator 207, typically used to power the microcontroller 208. Voltage sensor 204 and current sensor 205 are placed along output line 203 to monitor the voltage and current, respectively. The values of voltage and current are used by the microcontroller 208 as described.

The electrolytic cell 209 is driven by an analog device such as a double pole double throw (DPDT) relay 206. The DPDT 206 enables the polarity reversal with a time interval set by timer 213, which could be controlled by microcontroller 208; however, the timer 213 is often an independent device with a time interval set manually but the user. Furthermore, the DPDT 206 does not allow the modulation of the power applied to the electrolytic cell with a PWM like in the previous example. Fluid temperature and flow rate are measured by thermometer 210 and flow sensor 211, respectively. Electrolytic product concentration is ideally measured in line just downstream from the electrolytic cell with a sensor 212 specific to the type of product.

Figure 3:
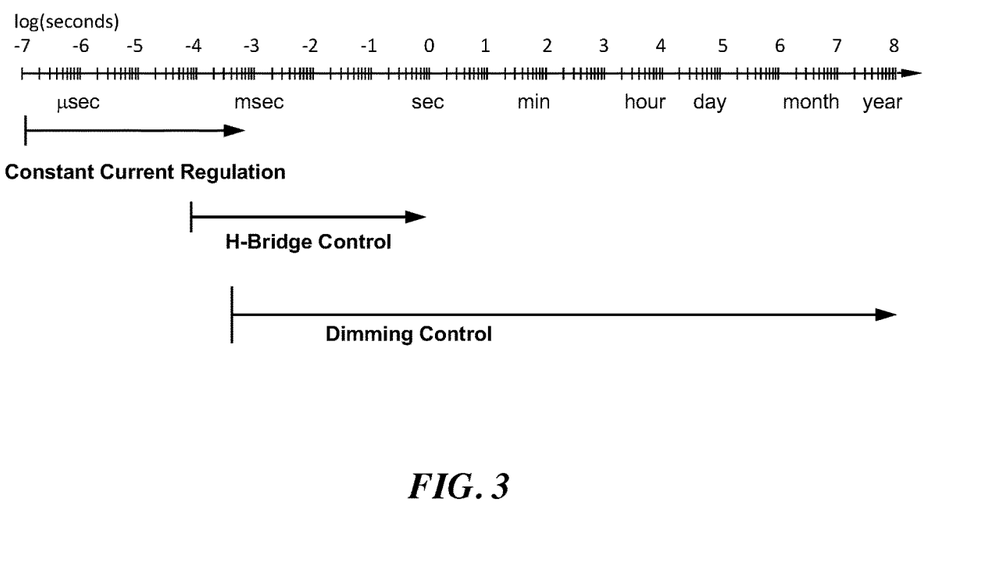
FIG. 3 is a time series chart that illustrates some possible dynamic ranges of the power management methods in accordance with the principles of the present invention.

The power management of the electrolytic cell can comprise constant current regulation, H-bridge control by PWM, and dimming control. FIG. 3 illustrates a time series chart of some possible dynamic ranges of constant current regulation, H-bridge control by PWM, and dimming control power management methods in accordance with the principles of the present invention. A dynamic range is defined as the fastest response time of a current control to maintain the applied constant current within a current deviation of less than about +/−10% of the desired constant current setpoint. It would be desired that the deviation from the applied constant current and the desired constant current setpoint be less than about 5%, ideally less than about 2%, preferably less than about 1%. The dynamic range is also referred to as the rise time of the current control as the minimum time necessary for reaching the desired setpoint within the desired current deviation. For an electrolytic cell device, electric load is not constant and can vary for the reasons described above on various time scales. Therefore, it is appropriate to adjust the applied constant current using the most suitable control.

A constant current regulator typically can maintain the constant current close to the desired applied current setpoint within the desired current deviation, even when load changes occur between tenths of microseconds to milliseconds. Fast load fluctuations can be due to fast dynamic changes at the interfaces of the electrode and water due to the erratic evolution of gasses and other electrolytic processes. Another typical fast fluctuation that requires fast current adjustments is the polarity reversal. Typically, the polarity reversal can occur in the sub-millisecond time scale.

Figure 4:
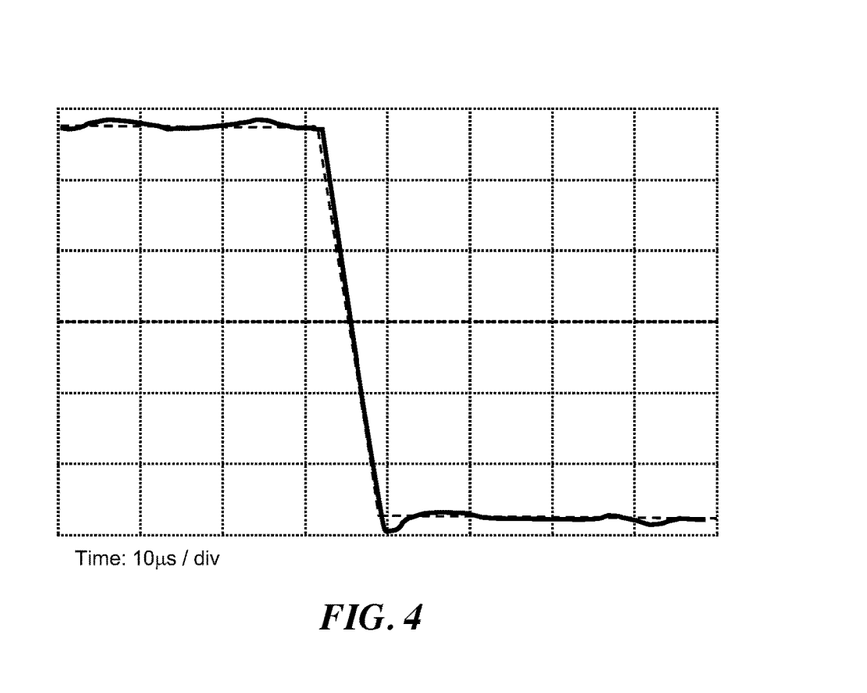
FIG. 4 is an oscilloscope display that illustrates an example of the current profile of an electrolytic cell upon reversal of the polarity in accordance with the principles of the present invention.

FIGS. 4-10 reproduce oscilloscope displays illustrating examples of various applied current profiles over time resulting from the application of power management of an electrolytic cell in accordance with the principals of the present invention. FIG. 4 is illustrates a typical example of the voltage polarity change that results in a change of the current applied, with current on the vertical axis and time (in 10 μs/div) on the horizontal axis. In FIG. 4 the current profile is shown in solid line (e.g., ----) and the applied current is shown in the dashed line (e.g., - - -). In this illustrative example, the polarity reversal change happens in less than 10 microseconds within the constant current regulator dynamic range, and the applied current follows the change closely. After the polarity change, it is important to notice that the current is stable around the desired constant current setpoint in less than 1-2 microseconds and remains close to the current setpoint within less than about 2% of the value and even about 0.5% of the setpoint value. This adjustment requires fast response time that is typically in analog devices. An analog constant current regulator can maintain the current constant even when the polarity changes abruptly because of load variability and polarity reversal changes; however, it would be practically impossible to provide such a tight control using digital feedback based on a microcontroller proportional-integral-derivative (PID) loop because the characteristic time constant of the cell changes over time.

The characteristic time constant of the cell, i.e. how fast the cell responds to temporal changes like the polarity reversal or electrolytic processes, is highly dependent on the physical and chemical properties of the electrodes, PEM, and fluid. Thus, permanent damage to the electrodes and membrane, transient heat increases and dissipation, and transient changes in the chemical composition of the fluid, such as ionic conductivity, can alter the characteristic time constant of the cell.

A possible approach would be a digital PID feedback loop; however, digital PID feedback loops can result in unpredictable current adjustments. A digital PID feedback loop enables control of an electronic device based on an input signal, a user-defined setpoint, and an output signal. A typical PID feedback loop is set to minimize the difference (error) between the input signal and the setpoint in microcontrollers. The feedback loop in a microcontroller typically uses a proportional (P) parameter, an integral (I) parameter, and a differential (D) parameter. The output signal of a PID loop is a train of pulses (squared wave) at a fixed frequency (typically 200 Hz to 2 MHz) but with modulated pulse widths, resulting in a modulated duty cycle known as pulse width modulation (PWM). The duty cycle of the PWM signal is typically a linear combination of the error multiplied by the PID parameters. The duty cycles are usually determined by an empirical process and are unique to the electrolytic system, more precisely to its time constant. If the time constant of the system changes, the PID parameters also change; however, PID parameters do not normally change during operation of the system because the PID parameters would have to be learned empirically again, typically by trial and error. It would be implemented without frequently interrupting the function of the system. Special processes are available to automatically re-learn the new PID parameters, but these processes produce sub-optimal parameters that do not predict well enough the time constant change.

For an electrolytic cell, a PID feedback loop that uses sub-optimal PID parameters is either too slow to properly maintain the constant current at the constant current setpoint or overshoots above the current setpoint, causing an excessive overcurrent through parasitic current pathways that can induce transient heating, permanent deformation of the PEM, and irreversible electrode damage. Therefore, digital PID feedback loops cannot substitute for an analog constant current regulator. Fluctuations of the electric load of the cell and the polarity reversal change are too fast for the microcontroller to maintain the current within a reasonable deviation from the setpoint. As a result, the current can easily exceed the desired constant current setpoint by more than 5% of the current setpoint, potentially resulting in permanent damage to the cell. Moreover, continuous use of an electrolytic cell is also often accompanied by an increase in the cell temperature (primarily due to the passage of current in the electrodes and fluid). As the cell time constant changes due to the temperature, the initial set of PID parameters is no longer suitable, resulting in unpredictable current adjustments.

Figure 5:
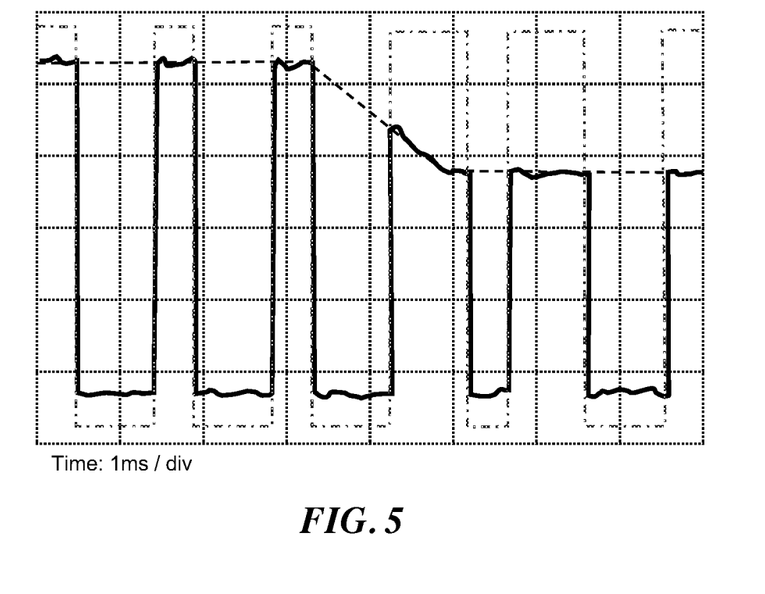
FIG. 5 is an oscilloscope display that illustrates an example of the current profile of an electrolytic cell upon a change of the current setpoint by the dimming control in accordance with the principles of the present invention.

In contrast, a PWM control of the H-bridge can be helpful to tune the electrolytic production but only when an analog constant current regulator is already in place. When an H-bridge controls an electrolytic cell, the applied constant current can be modulated by a PWM, as illustrated in FIG. 5. FIG. 5 illustrates an example of the current profile of the specific case of an electrolytic cell for the generation of ozone where the applied current is modulated at the H-bridge with a PWM signal (600 Hz) in conjunction with a change of the dimming of applied constant current at the constant current regulator (see discussion, below). In FIG. 5, the solid line (e.g., ----) represents the current profile of an electrolytic cell, the dashed line (e.g., - - - -) represents the applied constant current setpoint as changed by the dimming control, and the dash/dot line (e.g., -•-•-•-) represents the PWM control. The constant current regulator maintains the applied constant current at the desired constant current setpoint. Since a PWM control is used at the H-bridge, the cell is turned on-off at a frequency of about 600 Hz at a respective duty cycle. Since a PEM electrolytic cell for ozone generation behaves primarily as a resistor, the current also is modulated on-off with the same duty cycle. The analog constant current regulator is fast and limits well the applied constant current at the desired setpoint even when the rise of the PWM pulse is very fast, in the order of microseconds: in this illustrative example, the current setpoint change occurs in about 2 ms, within the dimming control dynamic range.

PEM electrolytic cells do not behave like brushed motors (capacitance) but rather as resistors. The current applied to the cell closely follows the voltage change during the PWM pulse, which happens in the order of microseconds. Using a PWM signal to the current applied to an electrolytic cell producing ozone results in ozone production being turned on and off with the same duty cycle. This type of control is beneficial to adjust ozone output to compensate for fluctuations that happen as fast as tenths of milliseconds or slower (see FIG. 3). Since the applied current is controlled on the fast time scale by an analog constant current regulator, the sudden changes of current due to the PWM are well maintained at the desired constant current setpoint.

One of the benefits of controlling the applied current using an analog constant current regulator in conjunction with a PWM is that the current is constant at the desired setpoint. As explained above, hydration and dehydration of the electrolytic cell during ozone production are strictly dependent on the current. Therefore, maintaining the current constant during the PWM cycles results in constant hydration of the cell, which also preserves better the dynamic behavior of the electrodes and PEM membrane, which in turn results in the extended longevity of the cell and constant ozone production.

The applied current setpoint can be adjusted by a dimming control of the analog constant current regulator. This control type is relatively slower than the H-bridge control with PWM and the analog constant current regulator. Typically, for an electrolytic cell producing ozone, the dimming control of the applied constant current is beneficial when the water flow rate varies. As explained above, the hydration of the membrane is important to preserve the integrity of the membrane and allow for constant ozone production. Moreover, the water flow allows for the dissipation of heat generated by the current passage through the electrodes and membrane. If the flow rate is diminished, it is desirable to reduce the applied current to preserve the cell integrity.

Figure 6:
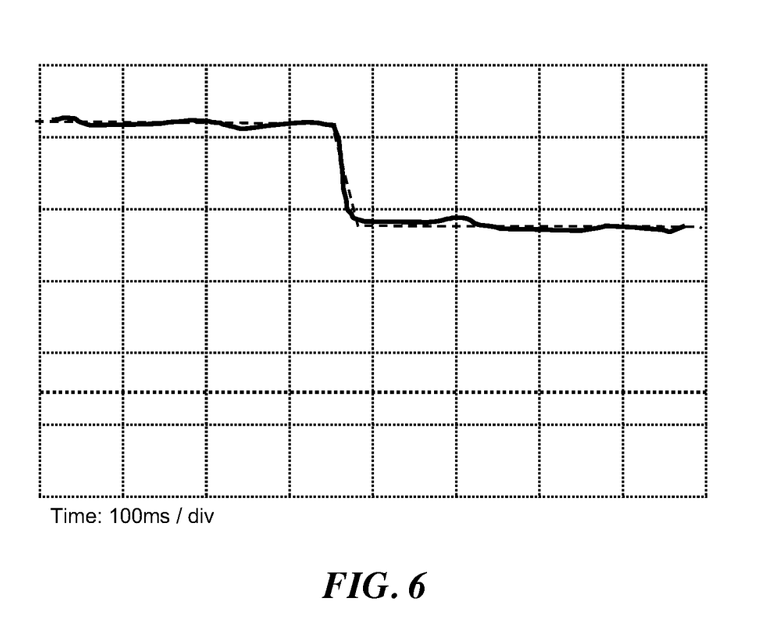
FIG. 6 is an oscilloscope display that illustrates an example of a current profile of an electrolytic cell upon change of the PWM H-bridge and the current setpoint in accordance with the principles of the present invention.

Dimming control can compensate for flow rate fluctuations in milliseconds to seconds or slower time scales. In addition, dimming control of the applied current setpoint is beneficial in conjunction with managing the applied current of the analog constant current regulator. FIG. 6 illustrates the case of a dimming control of the applied current setpoint (dashed line). FIG. 6 illustrates an example of a current profile (the solid line, e.g., ----) of an electrolytic cell upon change of the current setpoint (dashed line, e.g., - - -) with current on the vertical axis and time (in 100 ms/div) on the horizontal axis. In this illustrative example, the current setpoint change occurs in about 20 ms. As the current setpoint changes, the applied current (solid line) follows closely thanks to the analog constant current regulator, which maintains the current within less than about 5%.

Figure 7:
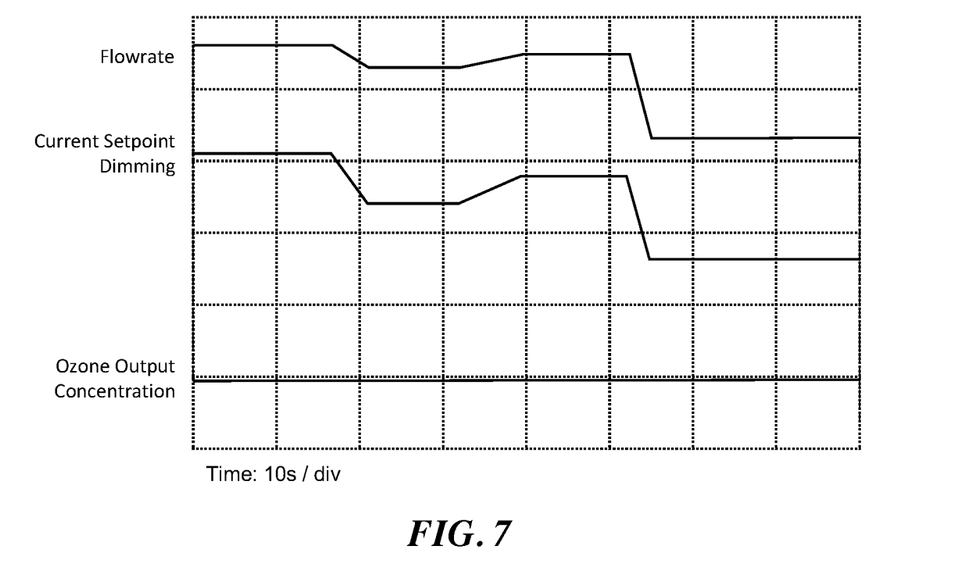
FIG. 7 is an oscilloscope display that illustrates an example of power management of an electrolytic cell producing ozone, in the absence or at a constant PWM H-bridge control, for maintaining ozone output constant by changing the current setpoint with the dimming control in response to the change of the flow rate in accordance with the principles of the present invention.

FIG. 7 illustrates an example of power management of an electrolytic cell producing ozone, in the absence or at a constant PWM H-bridge control, for maintaining ozone output constant by changing the current setpoint with the dimming control in response to the change of the flow rate, with current on the vertical axis and time (in 10 s/div) on the horizontal axis. FIG. 7 illustrates how the ozone output is maintained constant even when the flow rate varies, as the constant current setpoint is changed proportionally to the flow rate.

Figure 8:
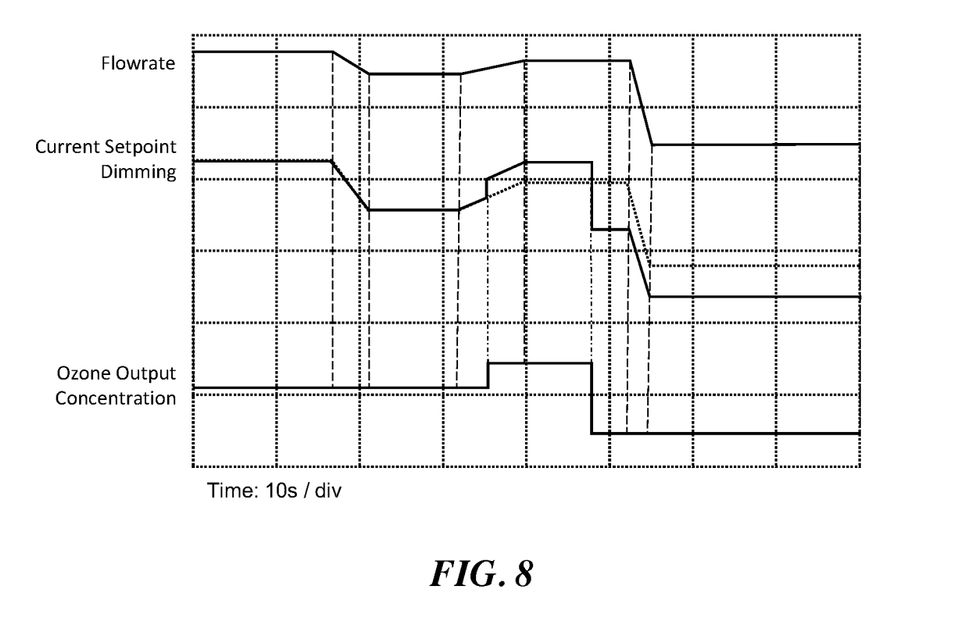
FIG. 8 is an oscilloscope display that illustrates an example of power management of an electrolytic cell producing ozone, in the absence of a constant PWM H-bridge control, for obtaining an exemplary ozone output by altering the current setpoint with the dimming control in response to the flowrate change and the desired ozone output in accordance with the principles of the present invention.
Figure 9:
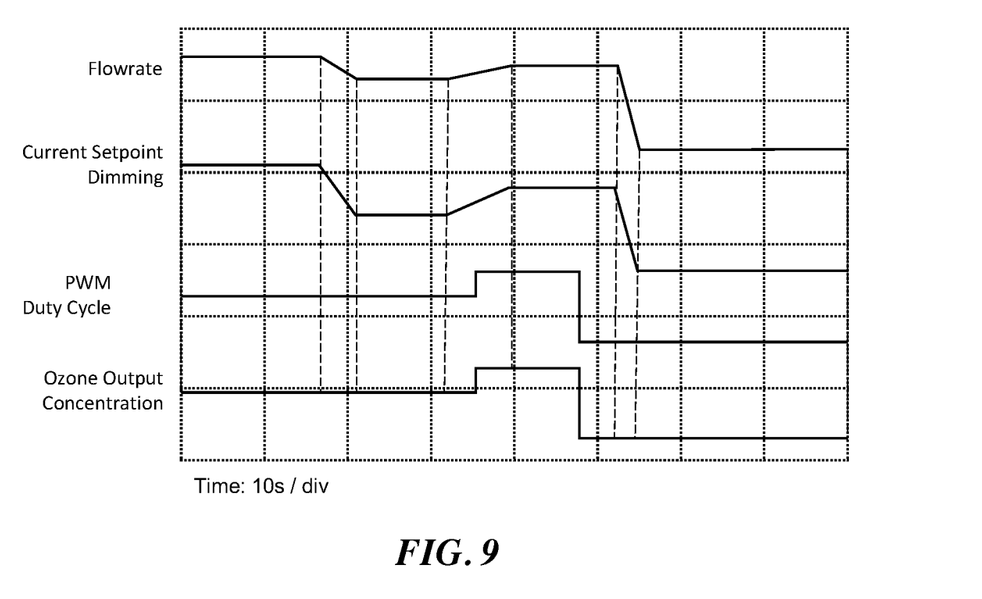
FIG. 9 is an oscilloscope display that illustrates an example of power management of an electrolytic cell producing ozone for obtaining an exemplary ozone output by altering the PWM duty cycle with the H-bridge control in response to the desired ozone output in accordance with the principles of the present invention.

FIGS. 8 and 9 illustrate other ways to control the ozone output. FIG. 8 illustrates an example of power management of an electrolytic cell producing ozone, in the absence of a PWM H-bridge control, for obtaining an exemplary ozone output by altering the current setpoint with the dimming control in response to the flowrate change and the desired ozone output, with current on the vertical axis and time (in 10 s/div) on the horizontal axis. In FIG. 8, the dimming of the current setpoint is not proportional to the flow rate, with the dimming of the current setpoint used to increase the ozone output momentarily. This situation is typical when the electrolytic cell is not driven by an H-bridge (FIG. 2); however, the same ozone output profile can be obtained by the modulation of the PWM duty cycle an H-bridge. This is seen in FIG. 9, which illustrates an example of power management of an electrolytic cell producing ozone for obtaining an exemplary ozone output by altering the PWM duty cycle with the H-bridge control in response to the desired ozone output, with current on the vertical axis and time (in 10 s/div) on the horizontal axis. In this example, the current setpoint is changed with the dimming control in response to the change of the flow rate while altering the PWM H-bridge control is used to increase the ozone output momentarily.

Figure 10:
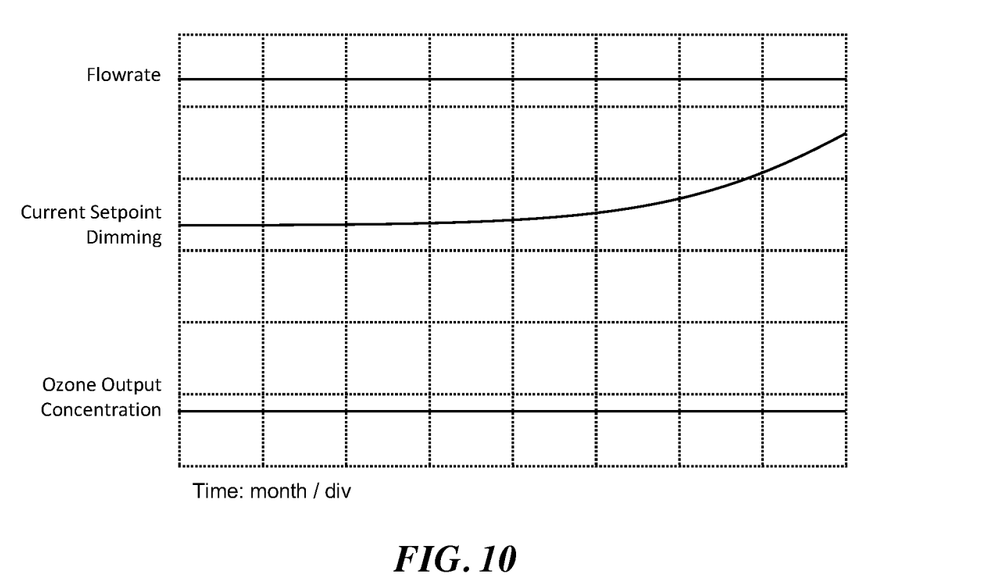
FIG. 10 is an oscilloscope display that illustrates an example of power management of an electrolytic cell producing ozone, in the absence of a constant PWM H-bridge control, for maintaining ozone output constant by changing the current setpoint with the dimming control in response to the aging of the cell in accordance with the principles of the present invention.

FIG. 10 illustrates an example of power management of an electrolytic cell producing ozone, in the absence of a constant PWM H-bridge control, for maintaining ozone output constant by the use of the dimming control of the current setpoint to compensate for the loss of ozone output due to the aging of the cell, with current on the vertical axis and time (in month/div) on the horizontal axis. Typically, the aging of the cell can be easily monitored by the applied voltage as measured by voltage sensors or. Therefore, as the average voltage increases due to the rise of the average cell electrical resistance and parasitic current paths, the dimming of the applied current setpoint also increases to force the cell to produce a constant ozone production.

While a system and apparatus in accordance with the principles of the present invention has been described with specific embodiments, other alternatives, modifications, and variations will be apparent to those skilled in the art. Accordingly, it will be intended to include all such alternatives, modifications and variations set forth within the spirit and scope of the appended claims.

What is claimed is:

1. A system for power management of an electrolytic device having an electrolytic cell comprising:
   a source of alternating current (AC);
   an alternating current to direct current (AC/DC) converter that inputs AC from the AC source and outputs direct current (DC);
   a constant current regulator that receives the DC from the AC/DC converter and outputs a regulated DC, the constant current regulator maintaining the DC constant at a current setpoint value;
   a dimming driver that applies dimming control of the DC to compensate for slow degradation of the electrolytic cell that decreases ozone production during the lifetime of the electrolytic cell;
   a relay into which the regulated DC is provided, the relay controlled by pulse width modulation (PWM), the PWM control of the relay allowing for adjustment of the electrolytic production output by turning the electrolytic cell on and off to control the polarization of the electrolytic cell;
   a sensor measuring fluid flow rate entering the electrolytic cell, whereby if the fluid flow rate entering the electrolytic cell changes, the DC changes; and
   an electrolytic cell comprising two electrodes separated by a proton-exchange membrane (PEM), the electrodes adapted to receive the regulated DC from the relay.

2. The system for power management of an electrolytic device having an electrolytic cell of claim 1 further wherein the relay comprises an H-bridge into which the regulated direct current is provided, the H-bridge controlling polarization of the electrodes by reversing current at periodic intervals of time.

3. The system for power management of an electrolytic device having an electrolytic cell of claim 1 further wherein the relay comprises a double pole double throw (DPDT) into which the regulated direct current is provided, the DPDT controlling polarization of the electrodes by reversing current at periodic intervals of time.

4. The system for power management of an electrolytic device having an electrolytic cell of claim 1 further comprising a light emitting diode (LED) driver that comprises the constant current regulator to maintain the DC constant at a user-defined constant current setpoint and the dimming driver to apply dimming control of the DC via a dimming input.

5. The system for power management of an electrolytic device having an electrolytic cell of claim 4 further wherein the LED driver comprises a dual dimming LED driver.

6. The system for power management of an electrolytic device having an electrolytic cell of claim 1 further wherein the constant current regulator comprises a metal-oxide-semiconductor field-effect (MOSFET) transistor that can be configured to output a constant current.

7. The system for power management of an electrolytic device having an electrolytic cell of claim 6 further wherein the MOSFET transistor comprises an LM317-based adjustable power supply circuit that can be configured to output a constant current.

8. The system for power management of an electrolytic device having an electrolytic cell of claim 1 further comprising a sensor providing input into a microcontroller of a parameter to manage the power of the cell.

9. The system for power management of an electrolytic device having an electrolytic cell of claim 8 further wherein the sensor measures current to monitor the constant current regulator.

10. The system for power management of an electrolytic device having an electrolytic cell of claim 8 further wherein the sensor measures voltage to enable estimation of the electrolytic cell lifetime.

11. The system for power management of an electrolytic device having an electrolytic cell of claim 8 further wherein the sensor measures temperature of the incoming fluid to estimate the expected lifetime of oxidants.

12. The system for power management of an electrolytic device having an electrolytic cell of claim 8 further wherein the sensor measures concentration of electrolytic products at the output of the cell.

13. The system for power management of an electrolytic device having an electrolytic cell of claim 8 further wherein the parameter is selected from the group consisting of regulated constant current, the DC voltage, water flowrate, electrolytic cell product output, water temperature, H-bridge temperature, and combinations thereof.

14. The system for power management of an electrolytic device having an electrolytic cell of claim 8 further wherein the sensor is selected from the group consisting of a flow meter, a current sensor, a voltage sensor, an ozone sensor, a temperature sensor, and combinations thereof.

15. The system for power management of an electrolytic device having an electrolytic cell of claim 1 further wherein the electrolytic cell further comprises boron-doped diamond (BDD) electrodes.

* * * * *